US009828934B2

United States Patent
Hamada et al.

(10) Patent No.: US 9,828,934 B2
(45) Date of Patent: Nov. 28, 2017

(54) IRON-BASED SPRAYED COATING, CYLINDER BLOCK FOR INTERNAL COMBUSTION ENGINE USING SAME, AND SLIDING MECHANISM FOR INTERNAL COMBUSTION ENGINE

(71) Applicant: NISSAN MOTOR CO., LTD., Yokohama-shi, Kanagawa (JP)

(72) Inventors: Takahiro Hamada, Kanagawa (JP); Akihiro Ikeda, Kanagawa (JP); Masaya Nakajima, Kanagawa (JP); Nobuhiko Satou, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 26 days.

(21) Appl. No.: 14/903,788

(22) PCT Filed: May 19, 2014

(86) PCT No.: PCT/JP2014/063157
§ 371 (c)(1),
(2) Date: Jan. 8, 2016

(87) PCT Pub. No.: WO2015/004993
PCT Pub. Date: Jan. 15, 2015

(65) Prior Publication Data
US 2016/0177863 A1    Jun. 23, 2016

(30) Foreign Application Priority Data
Jul. 9, 2013 (JP) ................................ 2013-143183

(51) Int. Cl.
*B21D 39/00* (2006.01)
*F02F 1/18* (2006.01)
(Continued)

(52) U.S. Cl.
CPC .................. *F02F 1/18* (2013.01); *C09D 1/00* (2013.01); *C23C 4/067* (2016.01); *F02F 3/10* (2013.01); *F02F 7/0002* (2013.01); *F02F 1/20* (2013.01)

(58) Field of Classification Search
None
See application file for complete search history.

(56) References Cited

U.S. PATENT DOCUMENTS 6,701,882 B2 *   3/2004   Barbezat .................. C23C 4/16
                                                              123/193.2
7,406,940 B2 *   8/2008   Nishimura ........... C10M 145/08
                                                              123/193.2
(Continued)

FOREIGN PATENT DOCUMENTS

JP    2001-271702 A    10/2001
JP    2003-138366 A     5/2003
(Continued)

OTHER PUBLICATIONS

Peter Ernst et al., Optimizing the Cylinder Running Surface / Piston System of Internal Combustion Engines Towards Lower Emissions, SAE International Technical Paper Series, vol. 1, Oct. 16, 2012, 12 pages.

*Primary Examiner* — Daniel J Schleis
(74) *Attorney, Agent, or Firm* — Foley & Lardner LLP

(57) ABSTRACT

An iron-based sprayed coating for coating a bore inner surface of a cylinder block for an internal combustion engine. A coating surface contains pits, its pit amount is within a range of 0.01% to 2.1%, and an average roughness Ra of this coating surface is within a range of 0.01 μm to 0.15 μm. The cylinder block for an internal combustion engine includes a bore having this iron-based sprayed coating on its inner surface, and a cylinder block body having the bore. A sliding mechanism for an internal combustion (Continued)

engine includes this cylinder block for an internal combustion engine and a piston slidable with the bore of this cylinder block. The piston has a piston ring, and the piston ring has a chromium coating, a chromium nitride coating, or a diamond-like carbon coating at a sliding part with the bore.

19 Claims, 2 Drawing Sheets

(51) Int. Cl.
    *C23C 4/067*     (2016.01)
    *C09D 1/00*     (2006.01)
    *F02F 3/10*     (2006.01)
    *F02F 7/00*     (2006.01)
    *F02F 1/20*     (2006.01)

(56) References Cited

U.S. PATENT DOCUMENTS

| | | |
|---|---|---|
| 2003/0164150 A1 | 9/2003 | Barbezat |
| 2011/0142384 A1* | 6/2011 | Hofmann ............ C23C 30/005 384/42 |

FOREIGN PATENT DOCUMENTS

| | | |
|---|---|---|
| JP | 2007-177760 A | 7/2007 |
| JP | 2007-302941 A | 11/2007 |
| JP | 2009-155720 A | 7/2009 |
| JP | 2013-44359 A | 3/2013 |

* cited by examiner

IRON-BASED SPRAYED COATING, CYLINDER BLOCK FOR INTERNAL COMBUSTION ENGINE USING SAME, AND SLIDING MECHANISM FOR INTERNAL COMBUSTION ENGINE

TECHNICAL FIELD

The present invention relates to an iron-based sprayed coating, more particularly, to an iron-based sprayed coating for coating on a bore inner surface of a cylinder block for an internal combustion engine, which iron-based sprayed coating achieves excellent scuffing resistance characteristics by appropriately controlling for example the amount of pits and surface roughness, a cylinder block for an internal combustion engine using the same, and a sliding mechanism for an internal combustion engine.

BACKGROUND ART

In conventional cylinder blocks for automobile internal combustion engines, a cylinder block made of aluminum alloy in which a liner made of cast iron is casted in is mainstream as a bore surface thereof. From the viewpoint of reducing weight of engine parts however, development is in progress for a cylinder block of a type that casts in liners made of aluminum instead of liners made of cast iron or for a monoblock made of aluminum alloy that has totally eliminated the liners made of cast iron.

However, liners made of aluminum and monoblocks made of aluminum alloy are problematic in their abrasion resistance and scuffing resistance characteristics. Although there are cases in which plating such as nickel plating is carried out thereto, this cannot be said as sufficient in relation to the abrasion resistance and scuffing resistance characteristics.

Moreover, as an alternative to the above means, also employed is a measure to improve abrasion resistance and scuffing resistance characteristics by spraying on spray powder by plasma flame to a cylinder bore inner surface to form a sprayed coating. For example, in the invention described in Patent Literature 1, the abrasion resistance and scuffing resistance characteristics with respect to a piston ring and piston are improved by spraying iron-based alloy powder on a bore surface of a cylinder block for an engine.

CITATION LIST

Patent Literature

[Patent Literature 1] Japanese Unexamined Patent Application Publication No. 2003-138366

SUMMARY OF INVENTION

Technical Problem

Although the sprayed coating formed by spraying the above iron-based alloy powder improves the abrasion resistance and scuffing resistance characteristics with respect to the piston ring and piston, for example, in a cylinder block in which an extremely high cylinder inner pressure is applied as like the recent high power engines, a high load is repetitively applied to the sprayed coating due to the high combustion pressure.

Consequently, scuff, that is to say, galling may practically generate, and furthermore, it was found that coating peeling also occurs. Generation of such scuff may easily lead to engine breakage, and is an important issue that has to be overcome by the most possible degree.

The present invention is accomplished in view of such problems the prior art possesses, and an object thereof is to provide an iron-based coating capable of achieving excellent scuffing resistance characteristics, a cylinder block for internal combustion engines using the same, and a sliding mechanism for internal combustion engines.

Solution to Problem

As a result of diligent study to achieve the above object, the inventors of the present invention found that the above object can be achieved by appropriately controlling the amount of pits and a surface roughness of the sprayed coating, and thus completed the present invention.

That is to say, an iron-based sprayed coating of the present invention is an iron-based sprayed coating for coating a bore inner surface of a cylinder block for an internal combustion engine.

It is characterized in that the coating surface contains pits and the amount of the pits is within a range of 0.01% to 2.1%, and an average roughness Ra of the coating surface is within a range of 0.01 μm to 0.15 μm.

Moreover, a cylinder block for an internal combustion engine of the present invention is characterized by comprising a bore having an iron-based sprayed coating as described above on an inner surface thereof, and a cylinder block body having this bore.

Furthermore, a sliding mechanism for an internal combustion engine of the present invention is a sliding mechanism for an internal combustion engine comprising a cylinder block for an internal combustion engine as described above, and a piston slidable with a bore of this cylinder block.

The piston has a piston ring, and this piston ring is characterized in that it has a chromium (Cr) coating, a chromium nitride (CrN) coating, or a diamond-like carbon (DLC) coating, at a sliding part with the bore.

Advantageous Effect of Invention

According to the present invention, since the amount of the pits and the surface roughness of the sprayed coating are appropriately controlled, it is possible to provide an iron-based coating that can achieve excellent scuffing resistance characteristics, a cylinder block for an internal combustion engine, and a sliding mechanism for an internal combustion engine.

DESCRIPTION OF EMBODIMENTS

An embodiment of an iron-based sprayed coating of the present invention is described below in details.

As described above, an iron-based sprayed coating of the present invention is an iron-based sprayed coating for coating a bore inner surface of a cylinder block for an internal combustion engine.

In a typical fabrication of this iron-based sprayed coating, after a cylinder block is cast and molded, an inner surface of the cylinder bore is pretreated to improve the adhesiveness of the sprayed coating, and iron-based metal material is sprayed as droplets on the pretreated cylinder bore inner surface, to form the sprayed coating.

In making droplets of the iron-based metal material here, iron-based alloy powder may be used as described in Patent Literature 1 (Japanese Unexamined Patent Application Publication No. 2003-138366). However, the present invention fundamentally uses a wire made from iron-based alloy.

In a so-called powder method as in Patent Literature 1, spherical particles overlap each other to form a coating, and thus can be easily peeled off, however with the so-called wire method, particles larger than the above overlap each other while being transversely stretched, and these particles mutually bond together while contracting in a length direction at the time of forming the coating. This thus allows for obtaining a coating relatively rigid and difficult to peel off.

In such wire method, the sprayed coating is formed by moving from one end to the other end a spraying gun inserted into a center hole of a cylindrical body, and spraying from a tip of the spraying gun droplets of spraying wire that is molten by flame, onto the bore inner surface.

Figure 1:
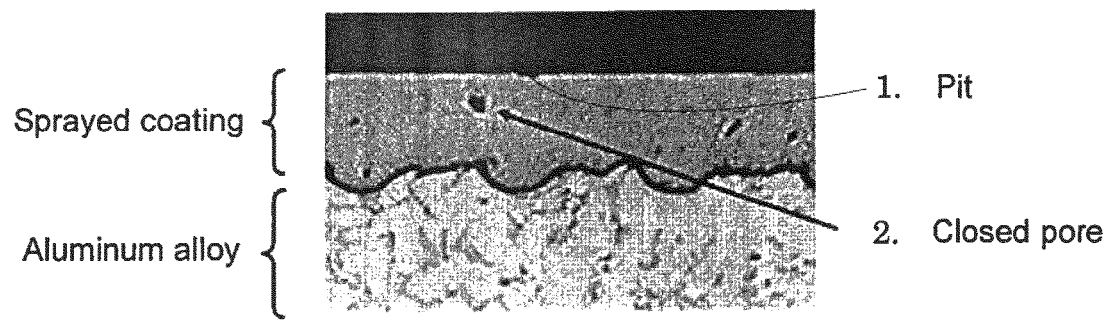
FIG. 1 is a cross-sectional photograph showing one example of a sprayed coating obtained by a wire method.

FIG. 1 shows one example of a cross-sectional photograph of a sprayed coating obtained by the wire method; in many cases, the coating contains pores 2, that is to say, closed pores that are confined, inside the coating. Moreover, pits 1 that are open pores having an opened part are formed on the surface of the sprayed coating.

Next described is about the characteristics of the iron-based sprayed coating of the present invention and the reasons for their limitations. This iron-based sprayed coating contains pits, that is to say, open pores such as recesses on the surface of the coating, and the amount of pits is within a range of 0.01% to 2.1% and an average roughness Ra of this coating surface is within a range of 0.01 Lm to 0.15 μm.

When the average roughness Ra exceeds 0.15 μm, the low friction cannot be achieved and friction heat increases, thus causing the scuff to easily generate. On the other hand, with an average roughness Ra of less than 0.01, a sliding portion of the iron-based metal that constitutes the coating increases, and retention of oil, for example lubricating oil that is provided for sliding, decreases, thus causing the scuff to easily generate.

Moreover, the pits are so-called recesses and possess an oil retention function; to further improve the oil retention properties of the sprayed coating, the amount of pits existing on the surface of the coating is made to be within the range of 0.01% to 2.1%.

This amount of pits means a total sum (percentage) of an area occupied by all the pits present in a unit coating surface area when observing the sprayed coating by plane observation, and can be measured from a surface photograph of the sprayed coating.

The iron-based sprayed coating of the present invention may include pores (closed pores) as shown in FIG. 1, and such pores also contribute to the improvement in oil retention properties.

Abundance of such pores in a cross section of the coating is referred to as a "cross section porosity". This cross section porosity means a total sum (percentage) of an area occupied by all the pores present in the unit coating cross-section area when observing said sprayed coating as a cross section as shown in FIG. 1, and can be calculated by converting the pores observed within the sprayed coating cross section photograph to numerical form by image analysis.

In the iron-based sprayed coating of the present invention, it is preferable that this cross section porosity be within a range of 0.01% to 2.1%.

When the cross section porosity exceeds 2.1%, strength of the sprayed coating may weaken, which may cause the coating to peel off. On the other hand, when the cross section porosity is less than 0.01%, the oil retention property decreases, which may cause scuff generation.

Moreover, in the present invention, it is preferable that an average hardness of this iron-based sprayed coating be within a range of HV280 to HV500.

With the average hardness of less than HV280, abrasion of the sprayed coating increases, which causes an increase in clearance and may cause the oil consumption to increase. On the other hand, when the average hardness exceeds HV500, aggressiveness to a mating piston ring and piston become high, which may cause an increase in abrasion of the piston ring and piston. Since excess piston ring abrasion and piston abrasion may lead to scuff generation, avoidance thereof is desired.

The sprayed coating of the present invention described above includes iron (Fe) as its main component, however it is preferable to include carbon (C) in an amount of 0.05 mass % to 0.25 mass %.

With a carbon content of less than 0.05 mass %, the hardness decreases, which decreases the strength of the sprayed coating; this may cause the coating to peel off. On the other hand, when the carbon content exceeds 0.25 mass %, the hardness increases, which increases the aggressiveness to a mating material (or a partner material); this may cause excess abrasion of the piston ring or the piston that are the sliding partners.

Next described is a cylinder block of an internal combustion engine of the present invention.

As aforementioned, the cylinder block for an internal combustion engine of the present invention comprises a bore having the iron-based sprayed coating described above on an inner surface thereof, and a cylinder block body having this bore.

Here, the iron-based sprayed coating may coat the entire inner surface of the bore, or may coat a bore inner surface portion that slides with the piston, with respect to a stroke of the piston used.

The cylinder block body may be made from cast iron, however is preferably made from aluminum alloy or magnesium alloy; this thus can attempt weight reduction of the internal combustion engine.

In this cylinder block for an internal combustion engine, it is possible to dispose a liner made from other metal, for example a liner made from cast iron or aluminum alloy in the bore, and coat the inner surface of that liner with the above iron-based sprayed coating.

Next described is a sliding mechanism for an internal combustion engine of the present invention.

As aforementioned, the sliding mechanism for an internal combustion engine of the present invention comprises the cylinder block for an internal combustion engine as described above, and a piston slidable with the bore of this cylinder block.

Furthermore, in this sliding mechanism, a piston has a piston ring, and this piston ring has a chromium (Cr) coating, a chromium nitride (CrN) coating, or a diamond-like carbon (DLC) coating on at least a sliding part with the bore.

As described above, although the sliding mechanism for an internal combustion engine has a bore whose inner surface is coated with the above iron-based sprayed coating, and exhibits excellent scuffing resistance characteristics and low abrasion performance, by using such sliding mechanism in combination with the piston having the piston ring that has the above coating, it is possible to exhibit even further excellent scuffing resistance characteristics and low friction performance.

Moreover, in the sliding mechanism of an internal combustion engine of the present invention, it is preferable that the piston has, at a piston skirt part thereof, a resin coating that contains a graphite-based or molybdenum-based solid lubricant.

As a result, in the sliding mechanism for an internal combustion engine of the present invention, by using the piston having the above resin coating in combination, it is possible to exhibit further excellent scuffing resistance characteristics and low friction performance.

Although the lubricating oil to be used in the sliding mechanism for an internal combustion engine of the present invention is not particularly limited and any commercially available lubricating oil can be used, it is possible to further exhibit excellent low friction performance by using a lubricating oil that contains molybdenum (Mo) as an additive.

EXAMPLES

The following describes the present invention in further details by use of Examples and Comparative Examples, however the present invention is not limited to these Examples.

Examples 1 to 10, Comparative Examples 1 to 7

Iron-based wire material of different components were used to form iron-based sprayed coating by plasma spray process on a surface of an aluminum alloy serving as base material, and thereafter, test pieces were cut out for evaluations of each Example, to be subjected to various performance evaluations. The sprayed coating characteristics for each Example are shown in Table 1.

<Performance Evaluation>

(1) Friction Evaluation Test Method with Piston Ring

Figure 2:
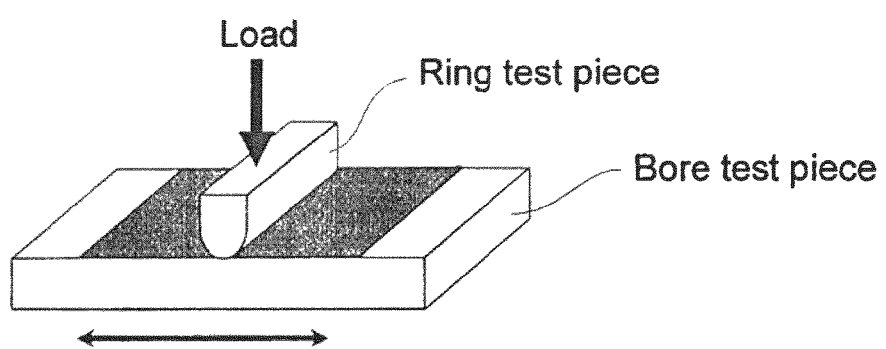
FIG. 2 is a schematic perspective view showing a friction testing machine of a sprayed coating.

As a friction evaluation test method of the sprayed coating, the test pieces for examination of each Example were subjected to a reciprocating slide type friction testing machine shown in FIG. 2, to measure friction values at the time of sliding. The test conditions were as specified below, and obtained test results are shown in Table 2.

Testing machine overview: FIG. 2
Sliding speed: 0.5 m/s
Temperature: 25° C.
Pressing weight: 10 kgf
Testing time: 1 hour
Lubricating oil: 5W30SL
Mating material (corresponding to piston ring): carbon steel serving as base material, sliding surface coated with CrN. Referred to as "Ring test piece" in FIG. 2.

(2) Scuff Evaluation Testing Method with Piston Ring

Figure 3:
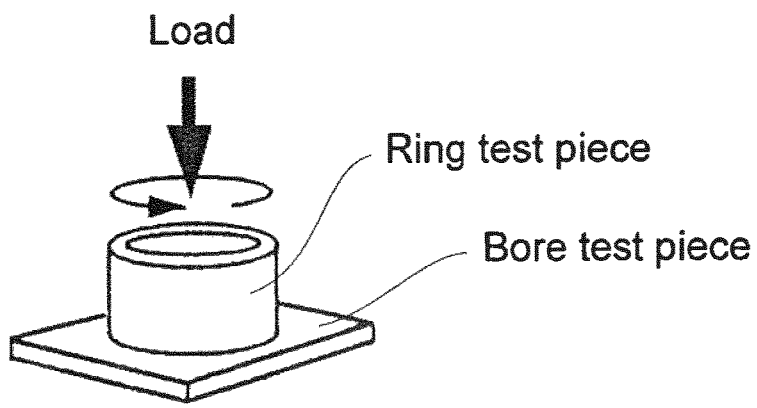
FIG. 3 is a schematic perspective view showing a scuff testing machine of a sprayed coating.

As the scuff evaluation of the sprayed coating, the testing pieces for evaluation of each Example were subjected to a sliding testing machine shown in FIG. 3, to measure scuff load resistance for each test piece. The testing conditions were as specified below, and obtained testing results are shown in Table 2.

Testing machine overview: FIG. 3
Measuring method: Apply a load of 10 kgf each, and have a rapidly increasing point of the friction force serve as ring scuff load
Sliding speed: 0.2 m/s
Temperature: 25° C.
Lubricating oil: 5W30SL (initial application only)
Mating sliding material (corresponding to piston ring): Carbon steel serving as base material, sliding surface coated with CrN. Referred to as "Ring test piece" in FIG. 3.

(3) Abrasion Evaluation Test Method with Piston Ring

As a friction evaluation method of the sprayed coating, the test pieces for evaluation of each Example were subjected to a reciprocating slide type friction testing machine shown in FIG. 2, to measure abrasion loss of a spraying sample board and a mating piston ring material (or piston material) (Abrasion thickness loss by using a shape measuring instrument was measured.). The test conditions were as specified below, and obtained test results are shown in Table 2.

Testing machine overview: FIG. 2
Sliding speed: 0.5 m/s
Temperature: 25° C.
Pressing weight: 10 kgf
Testing time: 1 hour
Lubricating oil: 5W30SL
Mating material (corresponding to piston ring): Carbon steel serving as base material, sliding surface coated with CrN. Referred to as "Ring test piece" in FIG. 2

(4) Peeling Evaluation Method of Sprayed Coating

Figure 4:
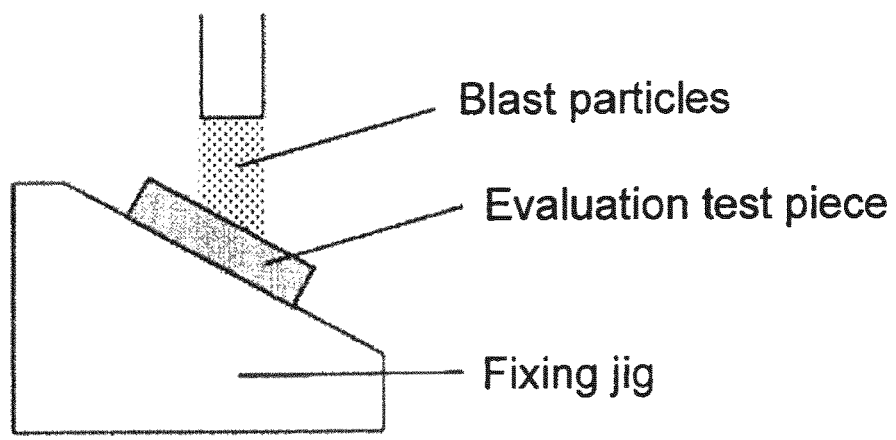
FIG. 4 is a schematic side view showing a peeling testing machine of a sprayed coating.

As peeling evaluation of the sprayed coating, the test pieces for evaluation of each Example were subjected to a blast erosion testing machine shown in FIG. 4, to measure the weight of the sprayed test pieces before and after the blast erosion test, and made the reduced amounts (peeled amounts) of sprayed coating serve as indices for the peeling resistance. Test conditions were as specified below, and obtained test results are shown in Table 2.

Testing machine overview: FIG. 4
Testing pieces shape: 50×50 mm (5 mm thickness)
Blast particles: Alumina particles
Irradiation amount: 50 g per time, total 5 times (250 g)
Measurement method: Irradiate sprayed surface with alumina particles, and measure the weight of the sprayed test pieces before and after the test

TABLE 1

| | Sprayed coating characteristics | | | | |
|---|---|---|---|---|---|
| | Surface Roughness Ra μm | Surface Pit Amount % | Cross section porosity % | Hardness HV | C Amount % |
| Ex. 1 | 0.01 | 0.03 | 0.04 | 380 | 0.11 |
| Ex. 2 | 0.15 | 0.18 | 0.17 | 374 | 0.10 |
| Ex. 3 | 0.02 | 0.01 | 0.03 | 385 | 0.11 |
| Ex. 4 | 0.03 | 0.21 | 0.20 | 395 | 0.11 |
| Ex. 5 | 0.03 | 0.02 | 0.01 | 364 | 0.09 |
| Ex. 6 | 0.10 | 0.20 | 0.21 | 390 | 0.11 |
| Ex. 7 | 0.08 | 0.14 | 0.14 | 280 | 0.06 |
| Ex. 8 | 0.07 | 0.15 | 0.75 | 500 | 0.25 |
| Ex. 9 | 0.06 | 0.13 | 0.13 | 282 | 0.05 |
| Ex. 10 | 0.07 | 0.14 | 0.14 | 494 | 0.25 |
| C. Ex. 1 | 0.17 | 0.23 | 0.23 | 380 | 0.10 |
| C. Ex. 2 | 0.008 | 0.009 | 0.008 | 390 | 0.11 |
| C. Ex. 3 | 0.17 | 0.22 | 0.22 | 395 | 0.11 |
| C. Ex. 4 | 0.16 | 0.23 | 0.23 | 270 | 0.04 |
| C. Ex. 5 | 0.17 | 0.24 | 0.23 | 510 | 0.26 |

TABLE 1-continued

| | Sprayed coating characteristics | | | |
|---|---|---|---|---|
| | Surface Roughness Ra μm | Surface Pit Amount % | Cross section porosity % | Hardness HV | C Amount % |
| C. Ex. 6 | 0.16 | 0.235 | 0.24 | 260 | 0.04 |
| C. Ex. 7 | 0.16 | 0.26 | 0.267 | 520 | 0.26 |

Ex.: Example; C. Ex.: Comparative Example

In Table 1, the surface pit rate was measured from a surface photograph of the sprayed coating of each Example, and the cross section porosity was measured from a cross section photograph of the sprayed coating of each Example.

TABLE 2

| | Abrasion test | | | | |
|---|---|---|---|---|---|
| | Friction measurement | Scuff test | Spray abrasion loss | Ring abrasion loss | Peeling test |
| Ex. 1 | 1.0 | 400 | 1.0 | 1.0 | 1.0 |
| Ex. 2 | 1.0 | 460 | 1.0 | 1.1 | 1.0 |
| Ex. 3 | 1.0 | 400 | 1.1 | 1.0 | 1.0 |
| Ex. 4 | 1.0 | 440 | 1.0 | 1.1 | 1.0 |
| Ex. 5 | 1.0 | 420 | 1.0 | 1.0 | 1.0 |
| Ex. 6 | 1.2 | 420 | 1.0 | 1.0 | 1.0 |
| Ex. 7 | 1.1 | 400 | 1.2 | 1.0 | 1.0 |
| Ex. 8 | 1.2 | 420 | 1.0 | 1.2 | 1.0 |
| Ex. 9 | 1.1 | 440 | 1.2 | 1.0 | 1.0 |
| Ex. 10 | 1.2 | 400 | 1.0 | 1.2 | 1.0 |
| C. Ex. 1 | 3.0 | 320 | 1.5 | 2.5 | 1.5 |
| C. Ex. 2 | 2.0 | 200 | 1.5 | 1.3 | 1.5 |
| C. Ex. 3 | 3.0 | 320 | 1.5 | 2.5 | 1.5 |
| C. Ex. 4 | 2.5 | 240 | 7.0 | 2.4 | 4.5 |
| C. Ex. 5 | 2.0 | 240 | 2.0 | 7.5 | 1.5 |
| C. Ex. 6 | 2.5 | 240 | 6.5 | 1.6 | 5.5 |
| C. Ex. 7 | 2.0 | 220 | 2.0 | 7.5 | 1.5 |

Ex.: Example; C. Ex.: Comparative Example

In Table 2, the results of the friction test are indicated by taking the friction value of Example 1 as a reference value of 1.0. This indicates that those with smaller numerical values have better friction values.

Moreover, for the results of the scuff test, the pressing load (kg) at which the scuff generated are shown as the scuff load. This indicates that those with larger numerical values excel more in scuffing resistance characteristics.

The results of the abrasion test are indicated by taking the abrasion loss of Example 1 as a reference value of 1.0. The "sprayed abrasion loss" indicates that those with smaller numerical values have smaller abrasion of the sprayed coating itself, and the "ring abrasion loss" indicates that those with smaller numerical values have smaller abrasion loss of the mating ring material, thereby indicating that there is no problem with aggressiveness to a mating material.

Furthermore, the results of the peeling test are indicated by taking the weight reduced amount of Example 1 as a reference value of 1.0. This indicates that those with smaller numerical values have better peeling resistance.

It can be seen from Table 1 and Table 2 that Example 1 to Example 4 belonging within the scope of the present invention excel in friction properties as compared with Comparative Example 1 that is outside the scope of the present invention, and excels in scuffing resistance characteristics.

Moreover, it can be seen that Example 5 and Example 6 belonging within the scope of the present invention excel in scuffing resistance characteristics as compared with Comparative Example 2 whose cross section porosity is outside its suitable scope, and excel in peeling resistance as compared with Comparative Example 3.

Moreover, it can be seen that Example 7 and Example 8 belonging within the scope of the present invention excel in abrasion resistance as compared with Comparative Example 4 whose HV is outside its suitable range, and excel in resistance against aggressiveness to a mating material as compared to Comparative Example 5.

Furthermore, it can be seen that Example 9 and Example 10 belonging within the scope of the present invention excel in abrasion resistance and peeling resistance as compared with Comparative Example 6 whose carbon content is outside its suitable range, and excels in resistance against aggressiveness to a mating material as compared with Comparative Example 7.

The present invention is described above with a few embodiments and Examples, however the present invention is not limited to these, and various modifications can be made within the scope of the substance of the present invention.

INDUSTRIAL APPLICABILITY

The iron-based sprayed coating of the present invention in principle exhibits excellent scuffing resistance characteristics due to its low friction property and good oil retaining properties, however by further controlling Vickers hardness and component ratio, it is possible to exhibit extremely excellent abrasion resistance, peeling resistance and low aggressiveness to a mating material.

This thus allows for providing sufficient reliability even under an environment with high load in the recent automotive industry, such as high power engines.

The expression of low friction in high power engines implement further improvement in fuel efficiency in such high performance engines, and contribute to energy saving.

Furthermore, the iron-based sprayed coating of the present invention implements a monocylinder block having excellent scuff performance and the like, made from aluminum alloy and without a liner made from cast iron; this further advances particularly the weight reduction of cylinder blocks in high performance engines, and also promotes energy saving.

Moreover, the technical gist of the present invention is applicable to not just the automotive industry but also to other industries that use internal combustion engines.

REFERENCE SIGNS 1 pit
2 pore (closed pore)

The invention claimed is:

1. An iron-based sprayed coating for coating a bore inner surface of a cylinder block for an internal combustion engine, wherein
   a surface of the iron-based sprayed coating contains pits,
   an amount of the pits on the surface is in a range from 0.01% to 0.21%, and
   an average roughness Ra of the surface is in a range from 0.01 μm to 0.15 μm.

2. The iron-based sprayed coating according to claim 1, further comprising pores, wherein a cross section porosity is in a range from 0.01% to 0.21%.

3. The iron-based sprayed coating according to claim 1, wherein the iron-based sprayed coating has an average hardness in a range from HV280 to HV500.

4. The iron-based sprayed coating according to claim 2, wherein the iron-based sprayed coating has an average hardness in a range from HV280 to HV500.

5. The iron-based sprayed coating according to claim 1, comprising iron as a main component and carbon in an amount of 0.05 mass % to 0.25 mass %.

6. The iron-based sprayed coating according to claim 2, comprising iron as a main component and carbon in an amount of 0.05 mass % to 0.25 mass %.

7. The iron-based sprayed coating according to claim 3, comprising iron as a main component and carbon in an amount of 0.05 mass % to 0.25 mass %.

8. The iron-based sprayed coating according to claim 4, comprising iron as a main component and carbon in an amount of 0.05 mass % to 0.25 mass %.

9. A cylinder block for an internal combustion engine, comprising:
    a bore having the iron-based sprayed coating according to claim 1 on an inner surface thereof; and
    a cylinder block body including the bore.

10. The cylinder block for an internal combustion engine according to claim 9, wherein the cylinder block body is made from aluminum alloy or magnesium alloy.

11. A sliding mechanism for an internal combustion engine, comprising:
    a cylinder block for an internal combustion engine including a bore having the iron-based sprayed coating according to claim 1 on an inner surface thereof and a cylinder block body including the bore; and
    a piston slidable with the bore of the cylinder block, wherein
        the piston includes a piston ring, and
        the piston ring has a chromium (Cr) coating, a chromium nitride (CrN) coating, or a diamond-like carbon (DLC) coating, on a sliding part configured to slide with the bore.

12. The sliding mechanism for an internal combustion engine according to claim 11, wherein the cylinder block body is made from aluminum alloy or magnesium alloy.

13. The sliding mechanism for an internal combustion engine according to claim 11, wherein the piston has, at a piston skirt part thereof, a resin coating containing a graphite-based or molybdenum-based solid lubricant.

14. The sliding mechanism for an internal combustion engine according to claim 12, wherein the piston has, at a piston skirt part thereof, a resin coating containing a graphite-based or molybdenum-based solid lubricant.

15. A cylinder block for an internal combustion engine, comprising:
    a bore having the coating according to claim 2 on an inner surface thereof; and
    a cylinder block body including the bore.

16. A cylinder block for an internal combustion engine, comprising:
    a bore having the coating according to claim 4 on an inner surface thereof; and
    a cylinder block body including the bore.

17. A cylinder block for an internal combustion engine, comprising:
    a bore having the coating according to claim 8 on an inner surface thereof; and
    a cylinder block body including the bore.

18. The iron-based sprayed coating according to claim 1, wherein the iron-based sprayed coating is formed by a wire method in which iron-based particles overlap each other while being transversely stretched such that the iron-based particles mutually bond together while contracting in a length direction at a time the iron-based sprayed coating is formed.

19. The iron-based sprayed coating according to claim 2, wherein:
    the pits comprise recesses having an open portion on the surface of the iron-based sprayed coating; and
    the pores are closed and embedded within the iron-based sprayed coating.

* * * * *